(12) United States Patent
Sakurai et al.

(10) Patent No.: US 9,882,469 B2
(45) Date of Patent: Jan. 30, 2018

(54) BOOSTER APPARATUS FOR A DIRECT CURRENT VOLTAGE GENERATOR

(71) Applicant: Seiko Instruments Inc., Chiba-shi, Chiba (JP)

(72) Inventors: Atsushi Sakurai, Chiba (JP); Hiroshi Saito, Chiba (JP)

(73) Assignee: SII SEMICONDUCTOR CORPORATION, Chiba-Shi, Chiba (JP)

( * ) Notice: Subject to any disclaimer, the term of this patent is extended or adjusted under 35 U.S.C. 154(b) by 74 days.

(21) Appl. No.: 14/664,413

(22) Filed: Mar. 20, 2015

(65) Prior Publication Data

US 2015/0280551 A1    Oct. 1, 2015

(30) Foreign Application Priority Data

Mar. 26, 2014    (JP) .................. 2014-064020

(51) Int. Cl.
*H02M 3/06* (2006.01)
*H02M 3/08* (2006.01)
*H02M 3/02* (2006.01)
*H02M 3/07* (2006.01)

(52) U.S. Cl.
CPC .............. *H02M 3/06* (2013.01); *H02M 3/02* (2013.01); *H02M 3/08* (2013.01); *H02M 3/07* (2013.01)

(58) Field of Classification Search
CPC ........................................................ H02M 3/06
USPC ........................................................ 323/304
See application file for complete search history.

(56) References Cited

U.S. PATENT DOCUMENTS

| | | | |
|---|---|---|---|
| 2009/0085537 A1* | 4/2009 | Nakabayashi | H02M 3/158 323/273 |
| 2011/0037432 A1 | 2/2011 | Sakurai et al. | |
| 2012/0313556 A1* | 12/2012 | Heid | H05H 5/06 315/506 |
| 2013/0163302 A1* | 6/2013 | Li | H02M 3/158 363/127 |
| 2014/0319919 A1* | 10/2014 | Fu | H02M 7/539 307/82 |

* cited by examiner

*Primary Examiner* — Jue Zhang
*Assistant Examiner* — Trinh Q Dang
(74) *Attorney, Agent, or Firm* — Brinks Gilson & Lione

(57) ABSTRACT

To provide a booster apparatus capable of being configured without using a plurality of voltage generators and with a simple circuit. A booster apparatus is equipped with a voltage generator, a plurality of boosting capacitors connected in series with the voltage generator, intermediary capacitors, and switch circuits configured to perform switching control of connections between the voltage generator, the plurality of boosting capacitors and the intermediary capacitors.

2 Claims, 3 Drawing Sheets

BOOSTER APPARATUS FOR A DIRECT CURRENT VOLTAGE GENERATOR

RELATED APPLICATIONS

This application claims priority under 35 U.S.C. § 119 to Japanese Patent Application No. 2014-064020 filed on Mar. 26, 2014, the entire contents of which is hereby incorporated by reference.

BACKGROUND OF THE INVENTION

Field of the Invention

The present invention relates to a booster apparatus which boosts the voltage of a voltage generator such as a secondary battery to a predetermined voltage with a simple means without using a plurality of voltage generators.

Background Art

In the case of a battery device which attempts to obtain a high voltage using voltage generators such as secondary batteries, a predetermined voltage necessary for the battery device has been obtained by performing such as connecting the secondary batteries in series.

FIG. 4 is a circuit diagram of a battery device which outputs a conventional high voltage. In the battery device, charging/discharging thereof has been controlled by a voltage generator 1 in which a plurality of secondary batteries are connected in series, and a plurality of voltage monitoring devices 2 (refer to, for example, Patent Document 1).

[Patent Document 1] Japanese Patent Application Laid-Open No. 2009-195100

SUMMARY OF THE INVENTION

However, in the battery device which outputs the conventional high voltage, the secondary batteries equivalent to the number required to obtain a predetermined voltage are connected in series. Thus, the higher the required voltage, the more the number of the secondary batteries increases, thus resulting in high cost of the battery device. Also, the voltage monitoring devices 2 corresponding to the number of the secondary batteries are required. Further, a problem arises in that when a plurality of secondary batteries are used, a difference in potential between the secondary batteries occurs so that the charging time of the battery device and the discharging time thereof become short, thus resulting in the shortening of the life of the battery device.

In order to solve the related art problems, one aspect of a booster apparatus of the present invention is configured as follows:

A booster apparatus includes a voltage generator, a plurality of boosting capacitors connected in series with the voltage generator, intermediary capacitors, and switch circuits configured to perform switching control of connections between the voltage generator, the plurality of boosting capacitors and the intermediary capacitors.

According to the present invention, a booster apparatus which performs boosting to a predetermined voltage required as a battery device only by one or necessary minimum voltage generators such as secondary batteries can be provided by the configuration of capacitors and switch circuits. Further, since a monitoring device for the voltage generator may also be connected only by the number of the voltage generators, an inexpensive booster apparatus can be realized. There can be provided a booster apparatus which needs not to consider a voltage difference generated upon series-connecting voltage generators since the number of the voltage generators may be one or the necessary minimum, and is capable of obtaining equimultiple boosted voltages at the voltage generators.

DESCRIPTION OF THE PREFERRED EMBODIMENTS

<First Embodiment>

Figure 1:
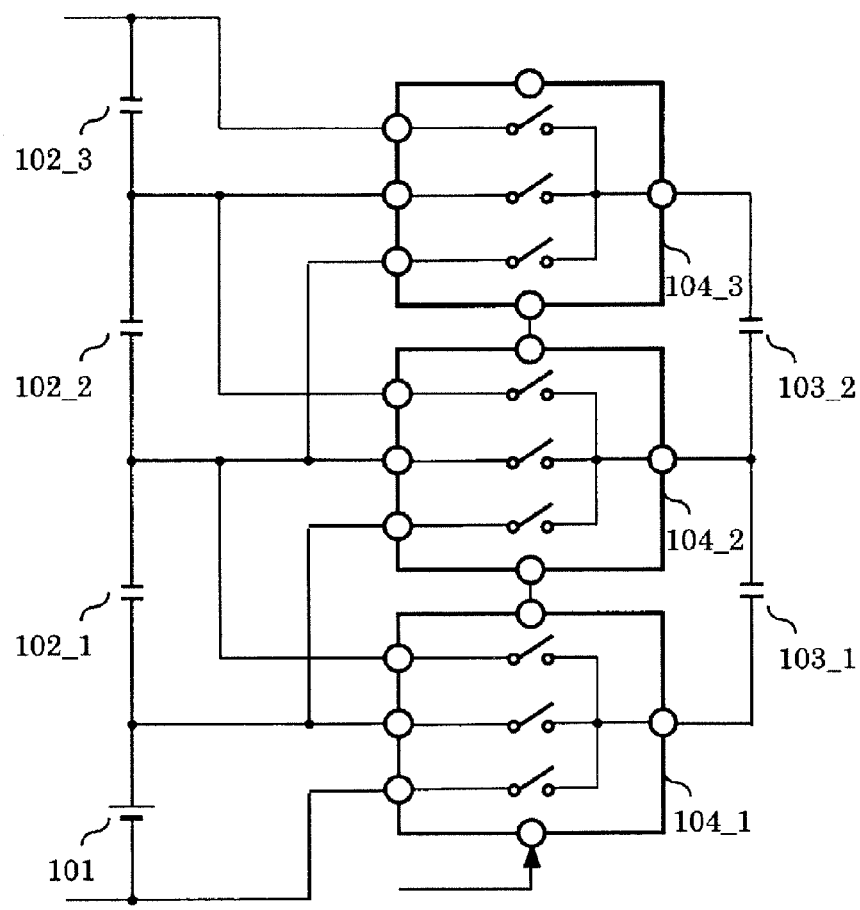
FIG. 1 is a circuit diagram of a booster apparatus according to a first embodiment.

FIG. 1 is a circuit diagram of a booster apparatus according to a first embodiment. The booster apparatus according to the first embodiment is equipped with a voltage generator 101 such as a secondary battery, capacitors 102_1 through 102_3, capacitors 103_1 and 103_2, and switch circuits 104_1 through 104_3.

The capacitors 102_1 through 102_3 are boosting capacitors for allowing a battery device to generate a predetermined voltage. The capacitors 103_1 and 103_2 are intermediary capacitors for charging the voltage of the voltage generator 101 to the boosting capacitors 102_1 through 102_3. The switch circuits 104_1 through 104_3 are control circuits which respectively switch connections between the capacitors 102_1 through 102_3 and the capacitors 103_1 and 103_2 to boost the voltage of the voltage generator 101.

Figure 2:
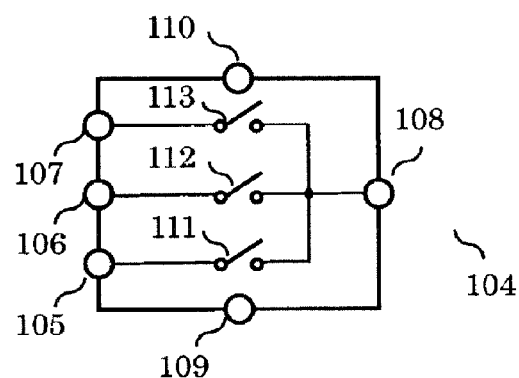
FIG. 2 is a circuit diagram of a switch circuit.

A circuit diagram of the switch circuit 104 is illustrated in FIG. 2. The switch circuit 104 is equipped with connection terminals 105 through 107, switches 111 through 113, a connection terminal 108, a switch control input terminal 109, and a switch control output terminal 110.

A description will be made about the connections of the booster apparatus according to the first embodiment. The voltage generator 101 has a negative power supply terminal connected to the connection terminal 105 of the switch circuit 104_1 and a positive power supply terminal connected to a negative power supply terminal of the boosting capacitor 102_1, the connection terminal 106 of the switch circuit 104_1, and the connection terminal 105 of the switch circuit 104_2. A positive power supply terminal of the boosting capacitor 102_1 is connected to a negative power supply terminal of the boosting capacitor 102_2, the connection terminal 107 of the switch circuit 104_1, the connection terminal 106 of the switch circuit 104_2, and the connection terminal 105 of the switch circuit 104_3. A positive power supply terminal of the boosting capacitor 102_2 is connected to a negative power supply terminal of the boosting capacitor 102-3, the connection terminal 107 of the switch circuit 104_2, and the connection terminal 106 of the switch circuit 104_3. A positive power supply terminal of the boosting capacitor 102_3 is connected to the connection terminal 107 of the switch circuit 104_3. A negative power supply terminal of the intermediary capacitor 103_1 is connected to the connection terminal 108 of the switch circuit 104_1. A positive power supply terminal of the intermediary capacitor 103_1 is connected to a negative power supply terminal of the intermediary capacitor 103_2 and the connection terminal 108 of the switch circuit 104_2. A positive power supply terminal of the intermediary capacitor 103_2 is connected to the connection terminal 108 of the switch circuit 104_3. The switch control input terminal 109 of the switch circuit 104_1 is connected to a switch controller (unillustrated herein). The switch control output terminal 110 of the switch circuit 104_1 is connected to the switch control input terminal 109 of the switch circuit 104_2, and the switch control output terminal 110 of the switch circuit 104_2 is connected to the switch control input terminal 109 of the switch circuit 104_3.

A description will next be made about the operation of the booster apparatus according to the first embodiment.

When the switch circuit 104_1 receives a control signal at the switch control input terminal 109 from the switch controller, the switch circuit 104_1 sequentially and selectively switches ON/OFF of the switches 111 to 113. The switch circuit 104_2 receives a signal from the switch control output terminal 110 of the switch circuit 104_1 at the switch control input terminal 109 thereof and is operated in such a manner that similar switches thereof are turned ON and OFF in synchronization.

First, when the switch circuit 104_1 receives a control signal at the switch control input terminal 109 from the switch controller, the switch circuit 104_1 turns ON the switch 111 to short-circuit the connection terminal 105 and the connection terminal 108. At this time, the switches 112 and 113 are OFF. Further, since the switch control input terminals 109 and the switch control output terminals 110 are connected in the switch circuits 104_1 through 104_3, all of ON/OFF control of the switches become the same. Accordingly, the voltage generator 101 is connected in parallel with the intermediary capacitor 103_1 by the switch 111 of the switch circuit 104_1 and the switch 111 of the switch circuit 104_2. Thus, the intermediary capacitor 103_1 becomes the same voltage as the voltage generator 101. Further, the boosting capacitor 102_1 is connected in parallel with the intermediary capacitor 103_2 by the switch 111 of the switch circuit 104_2 and the switch 111 of the switch circuit 104_3. Thus, the boosting capacitor 102_1 and the intermediary capacitor 103_2 become the same voltage.

Next, when the switch circuit 104_1 receives a control signal at the switch control input terminal 109 from the switch controller, the switch circuit 104_1 turns ON the switch 112 to short-circuit the connection terminal 106 and the connection terminal 108. At this time, the switches 111 and 113 are turned OFF. Further, other switch circuits 104_2 and 104_3 are similar. Thus, the boosting capacitor 102_1 is connected in parallel with the intermediary capacitor 103_1 by the switch 112 of the switch circuit 104_1 and the switch 112 of the switch circuit 104_2. Consequently, the boosting capacitor 102_1 becomes the same voltage as the intermediary capacitor 103_1. Likewise, the boosting capacitor 102_2 becomes the same voltage as the intermediary capacitor 103_2.

Next, when the switch circuit 104_1 receives a control signal at the switch control input terminal 109 from the switch controller, the switch circuit 104_1 turns ON the switch 113 to short-circuit the connection terminal 107 and the connection terminal 108. At this time, the switches 111 and 112 are turned OFF. Further, other switch circuits 104_2 and 104_3 are similar. Thus, the boosting capacitor 102_2 becomes the same voltage as the intermediary capacitor 103_1. Likewise, the boosting capacitor 102_3 becomes the same voltage as the intermediary capacitor 103_2.

Thereafter, when the switch circuit 104_1 receives a control signal at the switch control input terminal 109 from the switch controller, the switch circuit 104_1 turns ON the switch 111 to short-circuit the connection terminal 105 and the connection terminal 108. At this time, the switches 112 and 113 are turned OFF.

Further, the four voltages of the voltage generator 101 are generated between the positive power supply terminal of the boosting capacitor 102_3 and the negative power supply terminal of the voltage generator 101 by repeating the above operation. That is, the voltage generator 101, the capacitors 102 and 103, and the switch circuit 104 can configure the booster apparatus.

Incidentally, although the booster apparatus which generates the four voltage of the voltage generator 101 has been shown as the first embodiment, the serial number of the boosting capacitors 102 is not limited, and the boosted voltage is also not limited. Further, although there is shown as the switch circuit, the switch circuit 104 with the three switches as one unit, the number of switches for the switch circuit is not limited.

Thus, according to the booster apparatus of the first embodiment, there can be configured a booster apparatus which generates a predetermined voltage required as a battery device without increasing the number of voltage generators with a simple configuration based on one voltage generator, a plurality of capacitors connected in series therewith, intermediary capacitors, and switch circuits.

Further, since the voltage generator 101 is singular, a voltage monitoring device may be one.

Furthermore, since each boosting capacitor is allowed to generate the voltage of one voltage generator 101 through the intermediary capacitor, a booster apparatus can be configured without considering a voltage difference in the voltage generator.

<Second Embodiment>

Figure 3:
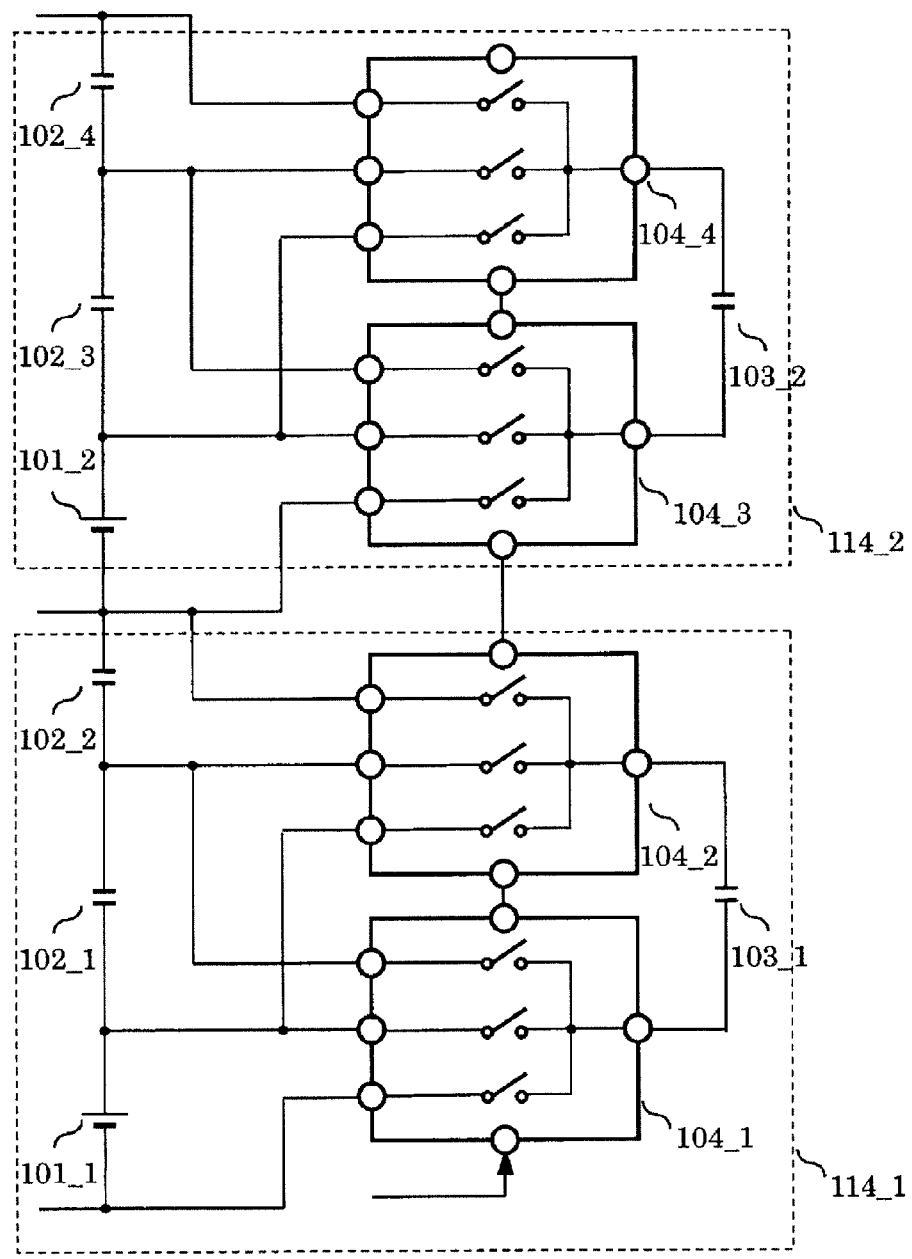
FIG. 3 is a circuit diagram of a booster apparatus according to a second embodiment.
Figure 4:
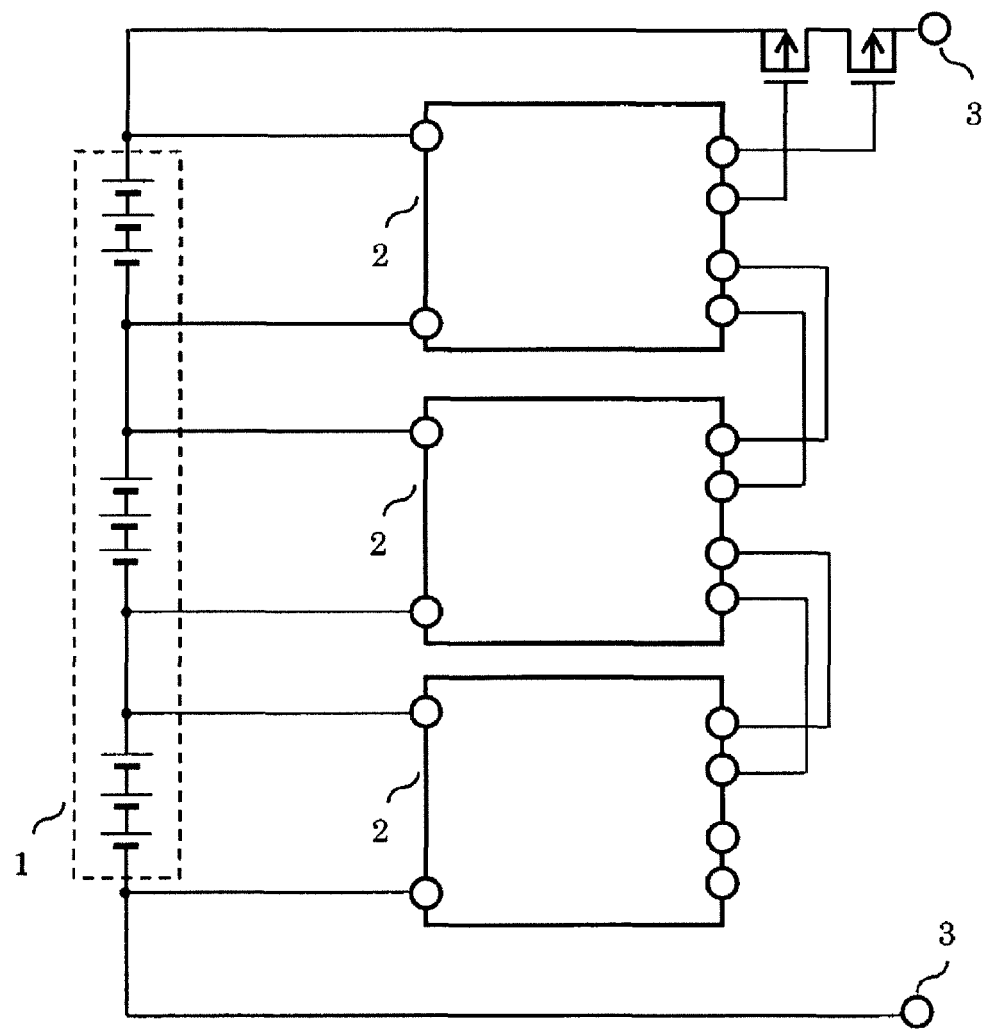
FIG. 4 is a circuit diagram of a related art battery device.

FIG. 3 is a circuit diagram of a booster apparatus according to a second embodiment. The booster apparatus according to the second embodiment is basically similar in configuration to the booster apparatus according to the first embodiment. The booster apparatus according to the second embodiment is comprised of a first boosting device 114_1 and a second boosting device 114_2.

The first boosting device 114_1 is comprised of a voltage generator 101_1, boosting capacitors 102_1 and 102_2, an intermediary capacitor 103_1, and switch circuits 104_1 and 104_2. Each of the switch circuits 104_1 and 104_2 is the switch circuit 104 illustrated in FIG. 2. The second boosting device 114_2 also has a similar circuit configuration.

The connections of the first boosting device 114_1 and the second boosting device 114_2 are similar to the booster apparatus according to the first embodiment. Then, the switch control output terminal 110 of the first boosting device 114_1 and the switch control input terminal 109 of the second boosting device 114_2 are connected to each other, and the boosting capacitor 102_2 of the first boosting device 114_1 and the voltage generator 101_2 of the second boosting device 114_2 are connected to each other.

The operation of the booster apparatus according to the second embodiment is basically similar to that of the booster apparatus according to the first embodiment.

By configuring in this manner, the booster apparatus according to the second embodiment is capable of generating voltages equivalent to six voltage generators between the positive power supply terminal of the boosting capacitor 102-4 and the negative power supply terminal of the voltage generator 101_1. That is, the booster apparatus according to the second embodiment is capable of obtaining boosted voltages equivalent to six voltage generators with less numbers of parts than the booster apparatus according to the first embodiment.

Incidentally, although the second embodiment has described the booster apparatus which obtains the boosted voltages equivalent to the six voltage generators, the vertically-arranged number of the boosting devices 114 is not limited and the boosted voltages are also not limited.

Further, although each switch circuit is illustrated with the three switches taken as one unit, the number of the switches is not limited.

Thus, according to the booster apparatus of the second embodiment, there can be configured a booster apparatus with less numbers of parts commensurate with a simple configuration based on minimal voltage generators, a plurality of boosting capacitors connected in series therewith, intermediary capacitors, and switch circuits.

According to the booster apparatus of the present invention, as described above, there can be configured a booster apparatus without increasing the number of voltage generators with a simple configuration based on minimal voltage generators, a plurality of boosting capacitors connected in series therewith, intermediary capacitors, and switch circuits.

What is claimed is:

1. A booster apparatus, comprising:
   a direct current (DC) voltage generating device;
   a plurality of boosting capacitors connected in series with the DC voltage generating device, wherein a positive terminal of the DC voltage generating device is directly connected to a negative terminal of a first capacitor of the plurality of boosting capacitors, and a negative terminal of the DC voltage generating device is connected to a positive terminal of a last capacitor of the plurality of boosting capacitors;
   a plurality of intermediary capacitors in series connections, wherein a terminal of a first intermediary capacitor is coupled to the positive terminal of the first capacitor of the plurality of boosting capacitors through a first switch of switch circuits, and a terminal of a last intermediary capacitor is coupled to the positive terminal of the last capacitor of the plurality of boosting capacitors through a last switch of switch circuits,
   wherein each of the switch circuits includes:
   a plurality of boosting terminals to which the DC voltage generating device and the plurality of boosting capacitors are connected,
   respective intermediary terminals, each connected with a corresponding terminal of the plurality of intermediary capacitors,
   a plurality of switches which respectively switch connections between the boosting terminals and the respective intermediary terminals,
   a switch control input terminal inputted with a control signal from each of the switches, and
   a switch control output terminal from which the control signal is outputted, and
   wherein a plurality of said switch circuits are connected and vertically stacked by the switch control output terminals and the switch control input terminals; and
   the switch circuits configured to perform switching control of connections between the DC voltage generating device, the boosting capacitors and the plurality of intermediary capacitors.

2. The booster apparatus according to claim 1, said booster apparatus being provided in plurality, said booster apparatus being connected and vertically stacked by the switch control output terminals and the switch control input terminals.

\* \* \* \* \*